G. DEL FAVERO.
GARMENT FASTENER.
APPLICATION FILED MAY 18, 1921.
1,437,727.
Patented Dec. 5, 1922.
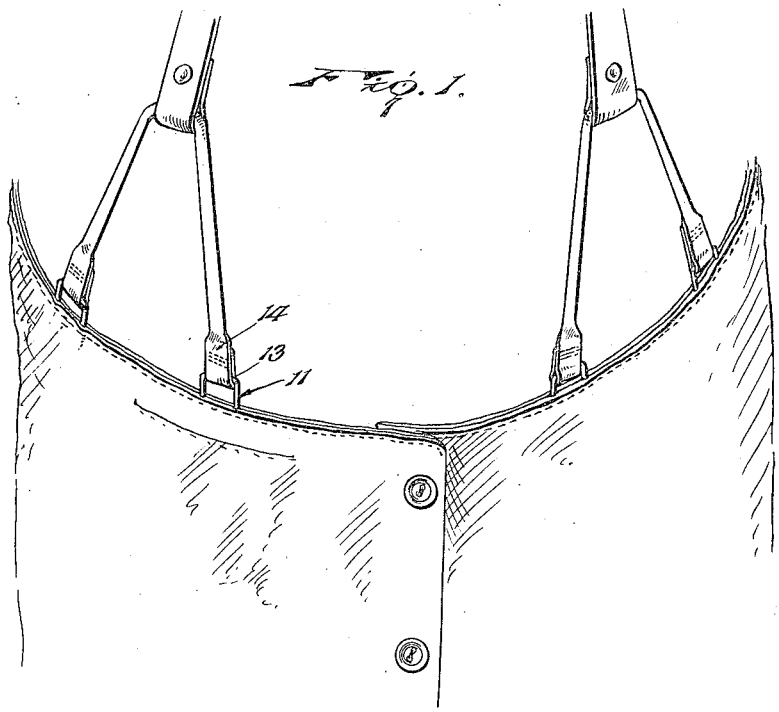
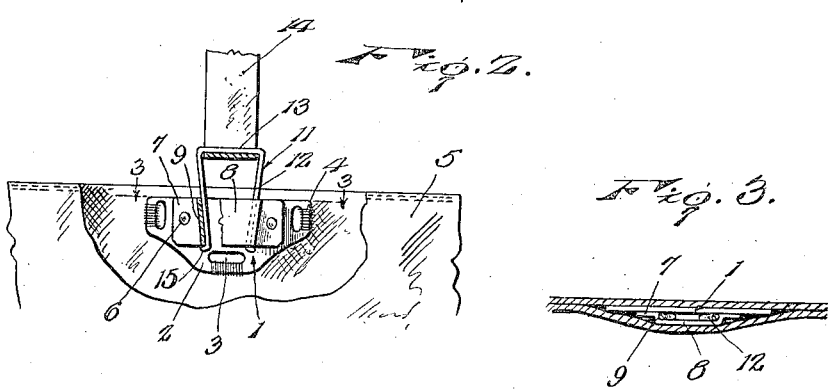
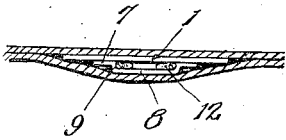
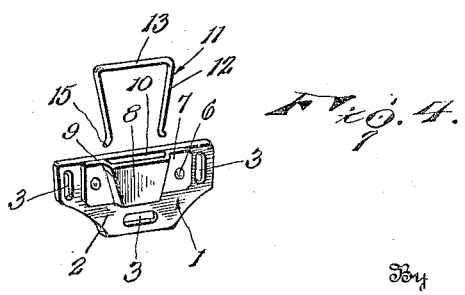
Inventor
G. Del Favero.
By Lacey & Lacey, Attorneys Patented Dec. 5, 1922.

1,437,727

UNITED STATES PATENT OFFICE.

GEORGE DEL FAVERO, OF CLEVELAND, OHIO.

GARMENT FASTENER.

Application filed May 18, 1921. Serial No. 470,498.

*To all whom it may concern:*

Be it known that I, GEORGE DEL FAVERO, a citizen of the United States, residing at Cleveland, in the county of Cuyahoga and State of Ohio, have invented certain new and useful Improvements in Garment Fasteners, of which the following is a specification.

This invention relates to garment fasteners and more particularly to a fastener for connecting the straps of a pair of suspenders with the waist band of a pair of trousers, or to be employed in a similar relation, and one of the primary objects of the present invention is to provide a fastener which will be adapted to securely connect the parts and which will be more secure and less liable to disarrangement or the loss of its elements than where buttons are employed for the same purpose.

Another object of the invention is to provide a fastener for the purpose stated the keeper member of which may be completely housed within the waistband of the trousers and thus not only concealed from view but likewise be prevented from coming in contact with other articles of clothing.

Another object of the invention is to so construct the fastener that the parts thereof may be readily mutually engaged and readily disengaged so as to provide for quick and ready attachment and detachment of the suspenders to the trousers.

Another object of the invention is to provide a fastener of the class mentioned which will be simple in construction and adapted to be manufactured at a low cost.

In the accompanying drawings:

Figure 1 is a perspective view illustrating the general application of the fastener;

Figure 2 is a view partly in elevation and partly in section illustrating one of the fasteners, the parts thereof being mutually engaged;

Figure 3 is a horizontal sectional view on the line 3—3 of Figure 2 looking in the direction indicated by the arrows;

Figure 4 is a perspective view illustrating the parts of the fastener separated.

The fastener embodying the present invention comprises a keeper member and a member engageable therewith, the keeper member being designed for attachment to the waistband of a pair of trousers and the second mentioned member being adapted for connection with the strap of a pair of suspenders. The keeper member is indicated in general by the numeral 1 and comprises an attaching plate 2 of sheet metal and of any desired marginal contour which plate is provided with any desired number of openings 3 whereby it may be stitched, as at 4, within the waistband of a pair of trousers 5. Riveted or otherwise secured, as at 6, to one face of the plate 2 is a plate 7 the intermediate portion of which is struck out to provide a wall portion 8 lying in spaced relation to the adjacent face of the plate 2, and relatively narrow wall portions 9 which extend at right angles to the plane of the plate 2 and the wall portion 8. Thus, the plate 2, wall portion 8 and walls 9, define a socket 10 which, as will be presently explained, is designed to receive the suspender-attached member of the fastener. As illustrated in Figures 2 and 4 of the drawings, the walls 9 of the socket 10 are inclined downwardly toward each other so that the socket is decreased in width in the direction of its lower end, and the said socket is open at both its upper and lower ends as best shown in Figure 2.

The suspender-attached member of the fastener is indicated in general by the numeral 11 and the same is preferably formed from a single length of wire bent at spaced points intermediate of its ends to provide spaced resilient locking fingers 12 and a connecting intermediate portion 13 which extends between the upper ends of the said fingers and which is designed to be suitably secured to the lower end of the suspender strap 14 in the manner illustrated in the drawings. As stated, the fingers 12 are resilient and as will be observed by reference to Figures 2 and 4 they are extended along lines converging toward each other in the direction of their lower ends, the lower end portions of the fingers being deflected outwardly in opposite directions to provide hooked terminals 15. Normally the terminals 15 of the fingers 12 are spaced apart a distance less than the width of the upper end of the socket 10 so that in mutually engaging the members of the fastener, the member 11 may be readily inserted into the said socket 10. As the parts are thus assembled, the said terminals 15 will ride inwardly along the inclined walls 9 of the socket until finally they will snap into engagement with the lower ends of these walls as best shown in Figure 2, whereupon the members of the fastener will be locked together to connect the parts to which they are attached. When it is desired to separate the members of the fastener, this may be readily done by exerting pressure against the opposite sides of the member 11 so as to spring the fingers 12 inwardly towards each other thus disengaging their hooked terminals 15 from the lower ends of the walls 9 of the socket 10 whereupon the member 11 may be readily withdrawn from the socket.

Having thus described the invention, what is claimed as new is:

A garment fastener comprising a keeper member consisting of a flat attaching plate provided at its ends with openings to receive means for securing the plate to a garment, and a plate secured at its end portions to one face of the attaching plate and having its intermediate portion struck out to provide a front wall spaced from the attaching plate and parallel therewith and side walls converging downwardly and connecting the front wall and the end portions, the said walls and the attaching plate defining a socket open at its upper and lower ends, and a holding member consisting of spaced resilient downwardly converging fingers and a portion connecting the upper ends of said fingers and secured in a garment-suspending device, the fingers being insertible through the socket to lie against the inner surfaces of the side walls thereof and having outwardly projecting hooked terminals to engage under the lower ends of the side walls of the socket.

In testimony whereof I affix my signature.

GEORGE DEL FAVERO.